Sept. 24, 1946.    N. H. YOUNG, JR    2,408,117
METHOD AND MEANS FOR THE REPRODUCTION OF INTELLIGENCE
Filed Feb. 20, 1943
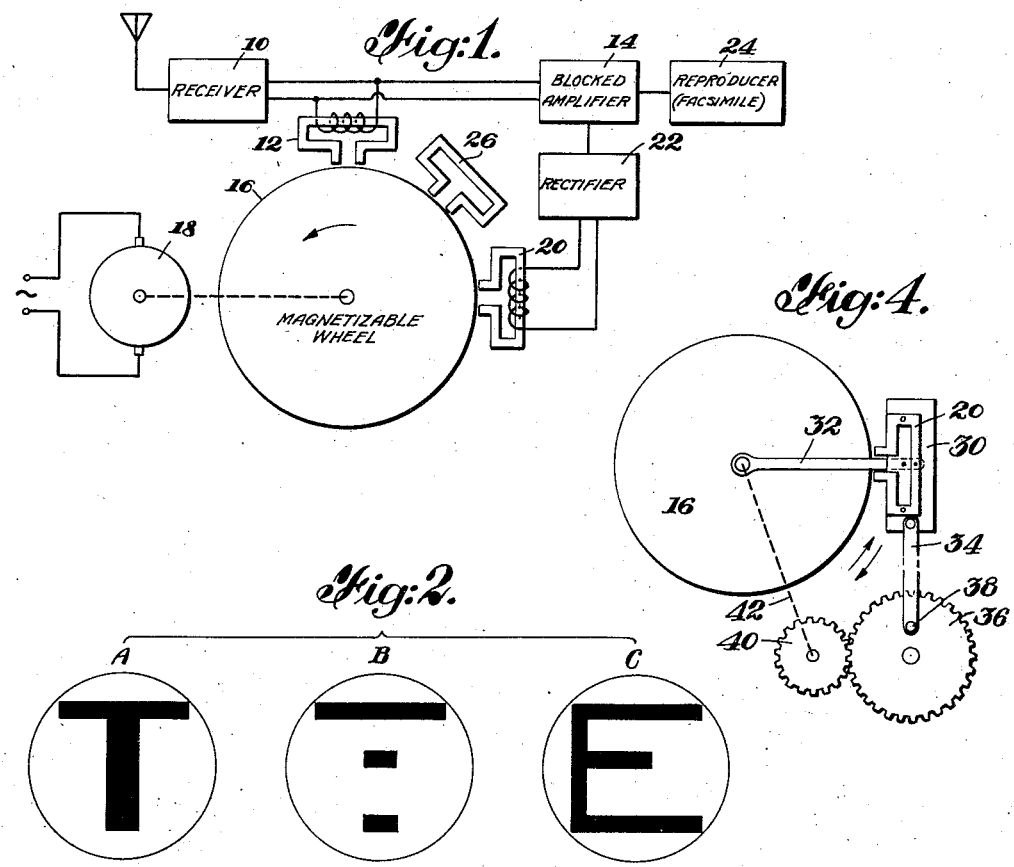
INVENTOR.
NORMAN H. YOUNG JR.
BY
ATTORNEY Patented Sept. 24, 1946

2,408,117

UNITED STATES PATENT OFFICE 2,408,117

METHOD AND MEANS FOR THE REPRODUCTION OF INTELLIGENCE

Norman H. Young, Jr., Jackson Heights, N. Y., assignor to Federal Telephone and Radio Corporation, Newark, N. J., a corporation of Delaware Application February 20, 1943, Serial No. 476,604

10 Claims. (Cl. 178—7.3)

This invention relates to method and means for the reproduction of intelligence, and more particularly to a communicating system which is difficult of interference by jamming.

An object of this invention is the provision of a novel system for the reproduction of intelligence from transmitted and received signals.

Another object is to provide such a system which is difficult to jam.

A further, more specific object of this invention is to provide a communicating system wherein the successful reproduction of intelligence depends upon the repetition of a signal at a constant, variable, or continually varying predetermined interval.

Other objects and advantages of the present invention will become apparent from the following description of a preferred embodiment, together with a modification thereof, illustrated in the accompanying drawing, in which:

Fig. 1 is a block circuit diagram of a communicating system in accordance with the present invention, schematically showing certain novel features thereof;

Fig. 2 diagrammatically shows examples of received intelligence;

Fig. 3 diagrammatically shows examples of signals corresponding to the examples of reproduced intelligence shown in Fig. 2;

Fig. 4 illustrates a modification of the apparatus illustrated in Fig. 1.

The system of the present invention is particularly directed to the reproduction of intelligence in the form of letters or corresponding indicia upon the screen of a cathode ray tube. The mechanics of such reproduction are in themselves well-known and the invention contemplates using present methods in the step of reproduction per se. However, the method of transferring the received signals to the intelligence reproducer provides, in accordance with the present invention, a new system which, as will become apparent as the description proceeds, provides an arrangement which is extremely difficult to jam.

As illustrated in Fig. 1, my system utilizes a receiver 10 for demodulating the received signals. The receiver 10 thus acts as a signal source, the output of which is applied simultaneously to a magnetizing coil 12 and a normally blocked amplifier 14. The magnetizing coil 12 is placed in juxtaposition to a magnetizable wheel 16 driven at constant speed by any suitable means such as motor 18. The received signals operating through the coil 12 will, accordingly, magnetize the rim of this wheel 16 in accordance with such signals, and in a manner which is per se well-known in the art. The magnetization of the wheel 16 will, upon rotation of the latter and after a predetermined time interval be picked up and reconverted into signals by the pick-up coil 20. This is connected through a suitable rectifier 22 to produce, for each signal component, an unblocking potential applied to the normally blocked amplifier 14. A suitable reproducer 24, which may be a cathode ray tube is fed from the block amplifier 14. After the signals have been picked up by the coil 20, the magnetization of the wheel producing such signals is erased by suitable magnet 26.

It will be clear from the foregoing description of the illustrated apparatus that when a signal is derived from the receiver 10 it will be impressed upon the magnetizable wheel through the coil 12, but cannot pass through the reproducer 24 since the amplifier 14 is normally blocked. However, if this signal is repeated at an interval such that the amplifier will be unblocked by the first signal at the same time that the second signal is received, this second signal will pass through the amplifier to the reproducer. It is accordingly contemplated by the present system that each signal to be reproduced as intelligence must be repeated at a time interval which will be the equivalent of the time which it takes for the wheel 16 to move from beneath the coil 12 to beneath the coil 20. Accordingly, unless the jamming signals are timed synchronously with the interval between duplicated signals the jamming effect thereof will be lost. Thus, essentially, in the form of invention illustrated in Fig. 1, I have provided a system which can only be jammed if the jamming signals are in synchronism with the duplication of signals to be jammed.

The manner in which the foregoing system works may be made clearer in connection with the examples illustrated in Figs. 2 and 3. Using for example, normal and known scanning methods to produce visual intelligence from received signals, it will be clear to those skilled in this art that if it is desired to reproduce the letter "T," Fig. 2 (A), the signal producing this letter will have somewhat the form as illustrated in Fig. 3 (A). When the first series of pulses such as shown in Fig. 3 (A) come through the receiver 10 they will not pass the blocked amplifier 14 but will be impressed upon the magnetizable wheel 16. When the magnetized impression upon the wheel 16 pass beneath the pick-up 20, the duplication of the original signal, Fig. 3 (A) will come through the receiver 10, but at this time the signal will pass through the amplifier 14 since the amplifier will be synchronously unblocked by the pick-up 20 and the rectifier 22 by an unblocking potential which will be of a duration corresponding to the individual signal components simultaneously applied from the pick-up device 20. Thus, the second signal coming from the receiver 10 will be used to produce a letter while the first signal at a later time is used to unblock the amplifier.

If, now, it is desired to send a second letter such as the letter "E," Fig. 2 (C) there may be one period of overlap during which the second signal for the letter "T" will be applied to unblock the amplifier 14, at the same time the first signal for the letter "E" is coming from the receiver. This overlap will produce a signal on the screen of the cathode ray tube such for example as shown in Fig. 2 (B), but it will be immediately recognized by the operator as having no meaning and will not seriously interfere with the interpretation of the intelligence to be conveyed. This false indication is caused by the unblocking of the amplifier 14 in accordance with the pulses shown in Fig. 3 (A) representing the letter "T," and the simultaneous application of the directly applied signal shown in Fig. 3 (B) representing the letter "E." The amount of overlap is represented by the short pulses shown in Fig. 3 (C).

It will be recognized that the amount of overlap and consequent false signal will be greatest when the signals representing the least sequential letters or indicia follows the prior letter at a time interval which is exactly the same as that between the duplicate signals of each letter. If however, the spacing between duplicated signals for each letter is sufficiently great no interference whatsoever will be produced, since by this time the second impression of the prior signal upon the magnetizable wheel will have already passed the pick-up 20, and probably the demagnetizing device 26 before the first signal for the second letter has been received.

While the aforedescribed system is, as previously pointed out, difficult to jam, there is still the possibility that a jamming station might discover the periodicity between duplicated signals for each letter and if the jamming were in synchronism with the interval such jamming would be effective. It is therefore contemplated that the position of either the coil 12 or the coil 20 be varied, either manually in accordance with some prearranged signal from the transmitting station, so that the time interval would be changed from time to time, or the position of one of these coils could be made to vary continuously in some predetermined manner which is synchronized in a corresponding change in sending interval at the transmitter. In Fig. 4, I have illustrated diagrammatically one arrangement which permits a continuous controlled shifting of the position of the pick-up coil 20. In this case, the magnet 20 is mounted by any suitable means upon a block 30 whose motion is constrained about the periphery of the wheel 16 by a suitable lever 32 which may be mounted about the shaft of the wheel 16. The block 30 is connected by a link 34 to a gear 36 by an offset pivot 38. The gear 36 may be driven by a smaller gear 30 which is connected by a shaft 42 with the driving shaft of the wheel 16. Through this arrangement it will be clear to those skilled in this art that upon rotation of the magnetizable wheel 16 an oscillatory circular motion will be applied to the block 30 thus the magnet 20 by the gears 36 and 40 through the pivot 38 and the link 34. It is specifically pointed out however, that the means for particularly oscillating the magnet 20 such as illustrated in Fig. 4 have only been given by way of example and that any one of the many well-known linkages for transferring rotary motion into oscillatory motion could be used.

Attention is also directed to the fact that while the reproduction of intelligence is, in the preferred embodiment illustrated, controlled by the blocking and unblocking of an amplifier, this control is, in effect, an electronic on off switch between the receiver and reproducer and it is contemplated that other equivalent switching devices either electronic or electromagnetic could be used.

The invention has been particularly described in connection with the reproduction of the first of two signals upon a magnetizable wheel to give the required time delay between duplicated signals in accordance with the principles of my invention. It is contemplated, however, that other equivalent and well-known means might be used in place of a magnetizable wheel. For example, a continuous magnetizable tape could be used in the same manner as a magnetizable wheel. The principles of the invention would, moreover still apply if the first signal were applied to a paper or similar tape either by inking the signal therein or forming the signal by suitably perforating the tape, in which case the pickup 20 would be spaced longitudinally along the tape in its direction of movement, the type of pick-up 20 depending upon the type of recording device used. If a paper tape system were used, the paper would probably be discarded after use and no erasing device would be required. These possible applications of my invention make use of well-known arrangements and since their use is believed to be obvious to those skilled in this art, no illustration of these equivalents is deemed necessary.

While the invention appears to be particularly applicable to systems in which the signals are reproduced as visual intelligence upon the screen of a cathode ray tube, it is deemed obvious that other types of reproducers known in the art may be used. In all cases, however, the principle of requiring a duplication of signal before the same can be reproduced is to be considered as the basic novel feature.

Accordingly, while I have described above the principles of my invention in connection with certain specific apparatus, and have described one particular modification thereof, it is to be clearly understood that such description is made only by way of example and not as a limitation on the scope of my invention as set forth in the objects and the accompanying claims.

I claim:

1. An intelligence reproducing system including, in combination, a receiver, a normally blocked amplifier connected to said receiver, an intelligence reproducer connected to said amplifier, movable signal-recording means, a recorder connected to said means for impressing received signals thereon, a pick-up device positioned adjacent said means and spaced from said recorder in the direction of movement of said means for reproducing the recorded signal, and means activated by said pick-up device for unblocking said amplifier.

2. The combination according to claim 1, in which said signal-recording means is a magnetizable wheel, said recorder is a magnetizing device, and said pick-up is responsive to the magnetization of said wheel.

3. The combination according to claim 1, in which said signal-recording means is a magnetizable wheel, said recorder is a magnetizing device, and said pick-up is responsive to the magnetization of said wheel, in combination with means intermediate said pick-up and said recorder in the direction of rotation of said wheel for demagnetizing the latter.

4. The combination according to claim 1, in combination with means for longitudinally varying the position of said pick-up relatively to said signal-recording means.

5. The combination according to claim 1, in combination with means for periodically longitudinally varying the position of said pick-up relatively to said signal-recording means.

6. An intelligence reproducing system comprising a signal source including signal recording means for repeating the signals, an intelligence reproducer, and control means intermediate said signal source and said reproducer, said control means including means solely responsive to a predetermined periodic duplication of a signal from said source for activating said reproducer to reproduce said signal.

7. An intelligence reproducing system including, in combination a receiver, a normally blocked amplifier connected to said receiver, an intelligence reproducer connected to said amplifier, means for unblocking said amplifier for periods corresponding to the duration of individual signal components, and time delay means including a signal recorder for energizing said unblocking means a predetermined time after the reception of a signal on said receiver, whereby said amplifier is only unblocked to pass intelligence to said reproducer whenever the signal is duplicated at said amplifier at said predetermined time.

8. The combination according to claim 7, in combination with means for varying said time delay means in accordance with the time interval between duplicated signals.

9. An intelligence reproducing system including in combination, a signal source including a recorder adapted to repeat each signal at least once at a predetermined time interval, means for converting a signal into visual intelligence, a normally blocked amplifier intermediate said signal source and said reproducer, and means responsive to the first of a pair of identical signals for unblocking said amplifier after said predetermined time interval, whereby the second of said identical signals will be applied to said reproducer.

10. An intelligence reproducing system, including in combination, a signal source including a recorder adapted to provide at least one sequential duplication of each desired signal at a predetermined time interval, an intelligence reproducer, normally blocked connecting means intermediate said signal source and said reproducer, means for unblocking said connecting means, and means for activating said unblocking means by the first of each duplicated signal synchronously with the application of the second signal to said connecting means, whereby the second of the two signals is converted into intelligence by said reproducer.

NORMAN H. YOUNG, Jr.